(No Model.)
W. EBERHARD.
Grain Drier.
No. 231,481. Patented Aug. 24, 1880.
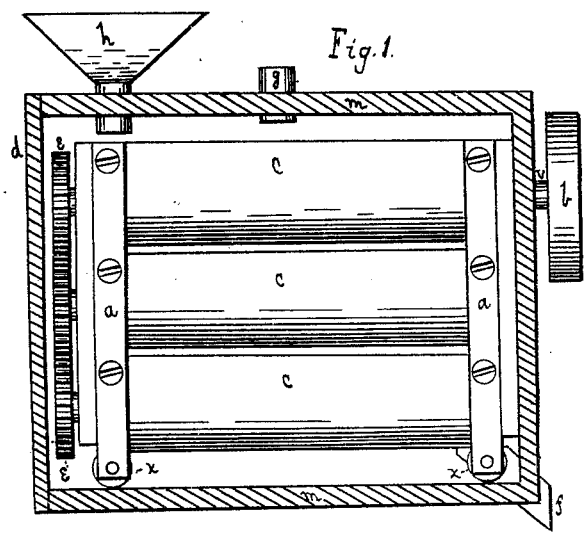
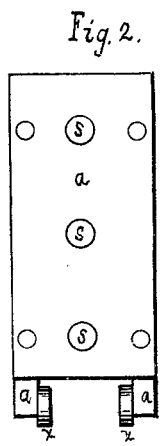
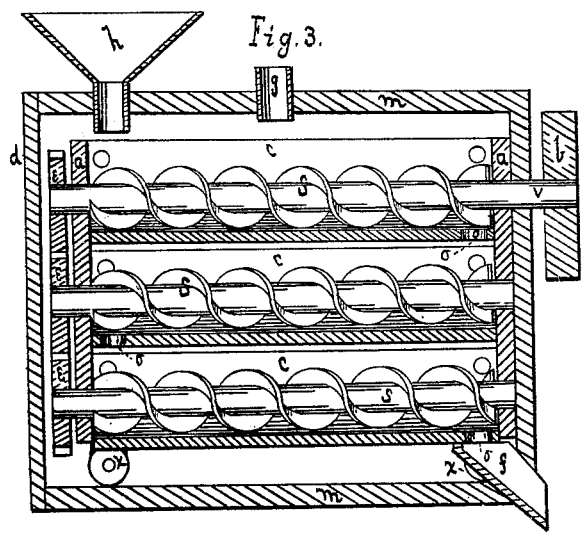
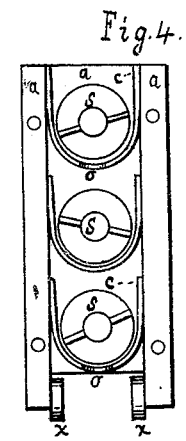
Witnesses.
Y. F. Howland
Philip R. Welsh
Inventor
William Eberhard
by Bradford Howland
Attorney.

UNITED STATES PATENT OFFICE.

WILLIAM EBERHARD, OF AKRON, OHIO.

GRAIN-DRIER.

SPECIFICATION forming part of Letters Patent No. 231,481, dated August 24, 1880.

Application filed May 18, 1880. (No model.)

*To all whom it may concern:*

Be it known that I, WILLIAM EBERHARD, of Akron, Ohio, have invented a new and useful Improvement in Grain-Driers, of which the following is a specification.

The nature and object of my invention is a grain-drier in which a series of troughs, one above another, is placed in the dry-box, and the grain being fed in one end of the upper trough is moved by a rotating screw to the other end of the trough, where it falls through an opening in the bottom into one end of the next trough beneath, each trough in the series being provided with a similar rotating screw and discharge-opening, for the purpose of moving the grain lengthwise of each trough in the series; also, combining the series of troughs and screw-conveyers with connecting-gear in a frame which is placed in the dry-box.

In the drawings, Figure 1 is an elevation of the grain-drier with one side of the dry-box removed. Fig. 2 is an end elevation of the trough-frame. Fig. 3 is a vertical longitudinal section. Fig. 4 is an end elevation of the series of troughs and frame with the end of the frame removed.

The troughs $c$ are attached by rivets or screws to frame $a$ in a horizontal position, one above another. A screw-conveyer, $s$, in and lengthwise of each trough $c$, is rotated to move the grain from one end of the trough to the other, where the grain falls through an opening, $o$, in the bottom of the trough, into the next trough beneath, until it is discharged through spout $f$ at opening $o$, in the bottom of the lowest trough $c$ in the series.

Each alternate conveyer $s$ is rotated in an opposite direction by means of pulley $b$ and connecting-gear $e$ on the shank of conveyer $s$, which is provided with bearings in the ends of frame $a$.

The series of troughs $c$, conveyers $s$, and their connecting-gear $e\ e\ e$ are all supported in frame $a$, which is provided with rollers or casters $x$, for convenience in placing it in and removing it from the dry-box $m$.

Dry-box $m$ is provided with a hopper, $h$, through which the grain is fed into one end of the upper trough $c$. It has an escape-pipe, $g$, for the escape of moisture from the drying-grain, and also has a spout, $f$, for the discharge of the grain from the lowest trough $c$ in the series. It has a door, $d$, at one end, through which frame $a$, with the series of troughs $c$, conveyers $s$, and gear $e\ e\ e$, is admitted, and at the other end it has an aperture through which passes an extended shank, $v$, of one of the conveyers $s$.

When frame $a$ (or a series of such frames) with its grain troughs and conveyers has been placed in dry-box $m$, the door $d$ may be closed and pulley $b$ placed on shank $v$ of conveyer $s$.

The necessary heat for drying the grain may be applied beneath dry-box $m$ in the ordinary manner by means of a heater or fire-box.

I am aware that grain-driers have been constructed in which the series of flues through which the grain is conveyed is of one piece of metal, entirely shutting off the grain from the air on one side of the series, and also that the series of flues or grain troughs and conveyers have been made as a part of and undetachable from the dry-box, and without having a frame separate from the dry-box.

I claim as my invention—

The series of troughs $c$, screw-conveyers $s$, connecting-gear $e\ e\ e$, and driving-shaft $v$, all attached together in frame $a$, in combination with a dry-box, $m$, provided with a hopper, $h$, discharge-spout $f$, door $d$, and a suitable aperture for the driving-shaft $v$ to project through the frame $a$, and its said attached parts being unattached to and removable from the dry-box $m$, substantially as described.

WILLIAM EBERHARD.

Witnesses:
BRADFORD HOWLAND,
C. R. GRANT.